United States Patent [19]

Welsch

[11] Patent Number: 4,892,044
[45] Date of Patent: Jan. 9, 1990

[54] CORNER STRUCTURE FOR A MODULAR SHELF AND METHOD OF MAKING SAME

[75] Inventor: John H. Welsch, Moscow, Pa.

[73] Assignee: InterMetro Industries Corporation, Wilkes-Barre, Pa.

[21] Appl. No.: 159,918

[22] Filed: Feb. 24, 1988

[51] Int. Cl.⁴ .............................................. A47B 3/06
[52] U.S. Cl. .................................... 108/154; 108/111; 108/144; 211/187; 403/235
[58] Field of Search ............... 108/154, 144, 111, 106, 108/107, 110; 248/188, 243; 211/189, 190, 207, 187; 403/234, 235, 188, 180, 217

[56] References Cited

U.S. PATENT DOCUMENTS

| | | | |
|---|---|---|---|
| 3,221,678 | 12/1965 | Doherty | 108/144 X |
| 3,915,101 | 10/1975 | Onori | 108/111 |
| 3,927,769 | 12/1975 | Maslow et al. | 108/144 X |
| 3,981,250 | 9/1976 | Anthony | 108/144 |
| 3,981,251 | 9/1976 | Damberg | 108/154 |
| 4,139,316 | 2/1979 | Svensson | 108/111 X |
| 4,230,052 | 10/1980 | Champagne | 108/107 X |
| 4,237,798 | 12/1980 | Welsch et al. | 108/144 X |
| 4,637,323 | 1/1987 | Nicely | 108/144 X |
| 4,706,576 | 11/1987 | James | 108/110 X |

FOREIGN PATENT DOCUMENTS 2729880  1/1979  Fed. Rep. of Germany ...... 108/144

Primary Examiner—Kenneth J. Dorner
Assistant Examiner—José V. Chen
Attorney, Agent, or Firm—Fitzpatrick, Cella, Harper & Scinto

[57] ABSTRACT

A shelving system includes a generally rectangular planar shelf member with truncated corners and a removable corner structure is provided at each such corner for supporting the shelf on a vertical corner post. The corner structure has a non-corroding rigid insert for supporting the shelf, and a non-corroding housing member is integrally formed about the rigid insert. Each corner structure is adapted to be secured to one truncated corner by a clamping bar and screw fasteners, and a tapered bore in the corner structure cooperates with a complementary sleeve having a frustoconical outer surface to securely mount the corner structure on the vertical support member.

15 Claims, 2 Drawing Sheets

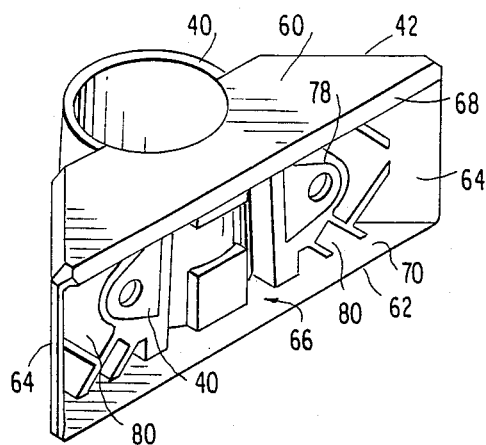
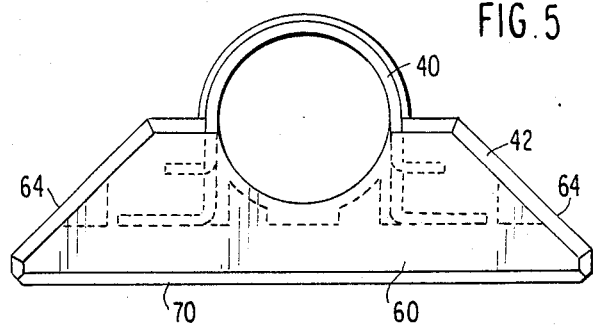
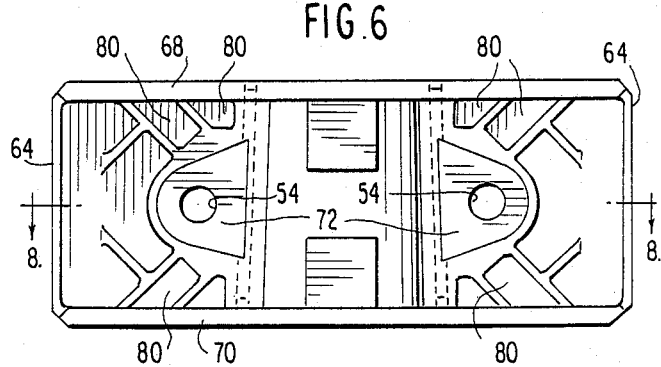
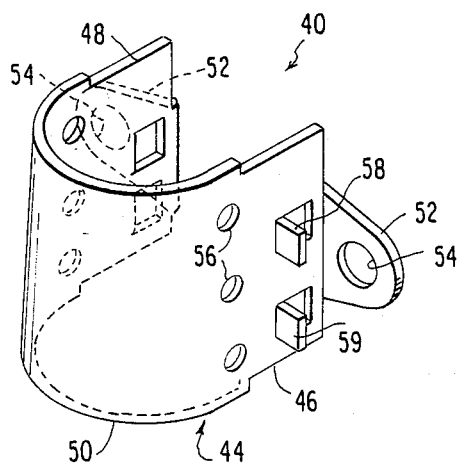
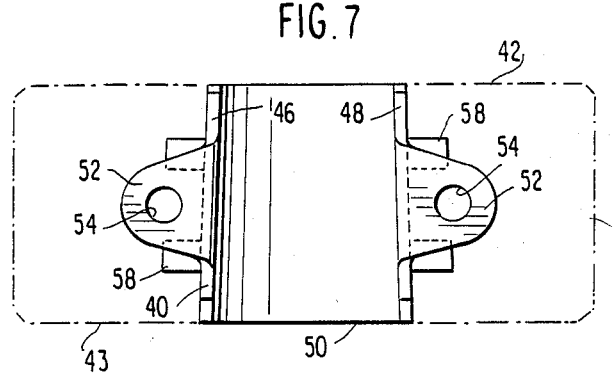
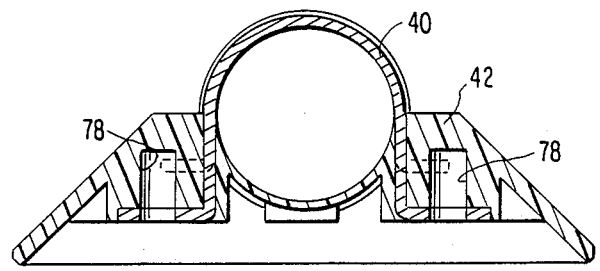

CORNER STRUCTURE FOR A MODULAR SHELF AND METHOD OF MAKING SAME

BACKGROUND OF THE INVENTION

1. Field of the Invention

The present invention generally relates to a corner structure used to support a shelf on a number of posts in a modular shelving system, and more particularly to an improved corner structure that is removable from the shelf.

2. Description of the Prior Art

Various structures supporting shelves on corner posts in modular shelving systems are known. A common problem of many such support structures is reinforcement of those portions of the shelf which are subject to large stresses. Typically, a shelf is generally of a planar, rectangular shape. When a load is placed on the shelf, even if uniformly distributed, the resulting stresses are generally high in the regions where the shelf is supported.

One such shelf and support structure are disclosed in U.S. Pat. No. 3,874,511. A similar system is shown in U.S. Pat. No. 3,927,769. These structures may include a sheet metal shelf or a shelf formed of a web of welded wires in known fashion. A corner connector is secured to each corner of the shelf to support it on four corner posts. Many times, the corner connector is die cast aluminum while the shelf, in the case of sheet metal, is stainless steel. Thus, while the shelf is highly resistant to corrosion, the corner structures, which support load on the corner posts, may not be in many environments.

In an attempt to overcome this problem, it has been suggested that the corner connectors be formed and welded of stainless steel parts, but because of their intricacy such designs are difficult to keep clean. They are also expensive and may lack the required rigidity. Investment cast stainless steel corner structures are very expensive. Suggestions have also been made to compression or injection mold corner connectors of various thermoplastic and thermosetting resins but such parts have been found to lack strength and rigidity.

Therefore, corner structures in certain known modular shelving systems have not been entirely satisfactory in all applications.

SUMMARY OF THE INVENTION

Accordingly it is an object of the present invention to provide a corner structure for supporting a shelf that is simple to construct and economical to manufacture, yet which satisfies the need for high strength and rigidity.

It is another object of the invention to provide a corner structure of the class described that resists corrosion in most all environments.

It is another object of the present invention to provide such a corner structure that can easily be assembled with shelves of known design.

In order to achieve the aforementioned objects, as well as other objects that will become apparent from the following detailed description of the preferred embodiment, a corner structure in accordance with the present invention comprises a two part assembly. A first part, or insert, is fabricated of, for example, stainless steel. This insert carries the major portion of the load placed on the shelf supported by such corner structure. A second part, or housing, preferably is fabricated of glass filled nylon resin and encapsulates a major portion of the insert. The housing also enhances the asthetic appearance of the assembly and the ease of keeping it sanitary and seals much of the stainless steel insert against corrosive elements.

In manufacture of the corner structure of the present invention, the stainless steel insert may be produced in advance and then placed into an injection mold. The resin is then injected into the mold and is integrally formed about the insert.

These and other objects, aspects, features and advantages of the present invention will become apparent from the detailed description provided below taken in conjunction with the accompanying drawing.

BRIEF DESCRIPTION OF THE DRAWINGS

FIG. 3 is a perspective view of the corner connector in accordance with the present invention.

FIG. 4 is a perspective view of the insert of the corner connector in accordance with the invention.

FIG. 5 is a top view of the corner connector in accordance with the present invention.

FIG. 6 is a front elevational view of the corner connector in accordance with the present invention.

FIG. 7 is a front elevational view of the insert.

FIG. 8 is a horizontal cross-sectional view of the corner connector taken on plane 8—8 in FIG. 7.

FIGS. 1 and 2 show a shelf of the type described in U.S. Pat. No. 3,874,511, the disclosure of which is incorporated herein by reference, to which one corner structure 12 in accordance with the present invention is secured. The shelf 10 is rectangular and planar and is formed of sheet metal. The shelf has truncated corners 14, each formed by bending two flanges from the peripheral wall or skirt 18 of the shelf 10 and one flange 20 folded downwardly from the planar sheet metal surface 22 of the shelf, all as described in U.S. Pat. No. 3,874,511. The corner structures 12 each comprise a corner connector generally shown at 24 and a clamping bar 26 preferably made of stainless steel. A pair of screws 28 rigidly secure each clamping bar 26 to an associated corner structure 24 with the flanges 16 and 18 sandwiched therebetween. Each corner connector is supported on a corner post 30 through cooperation with a sleeve 32 which has a cylindrical inner surface 34 and frustoconical outer surface 36. As is known, the frustoconical surface 36 of the sleeve 32 is complementary to an inner frustoconical tapered bore 38 located in each corner structure 24. By fixing the sleeve 32 on the post 30 as shown in FIG. 2, namely with an external upwardly decreasing frustoconical surface, and by mounting the corner structure 24 on the sleeve 32 with the internal frustoconical surface of the bore 8 in tight mating relation therewith, secure engagement between the sleeve 32, the corner structure 24 and the post 30 is achieved.

Figure 1:
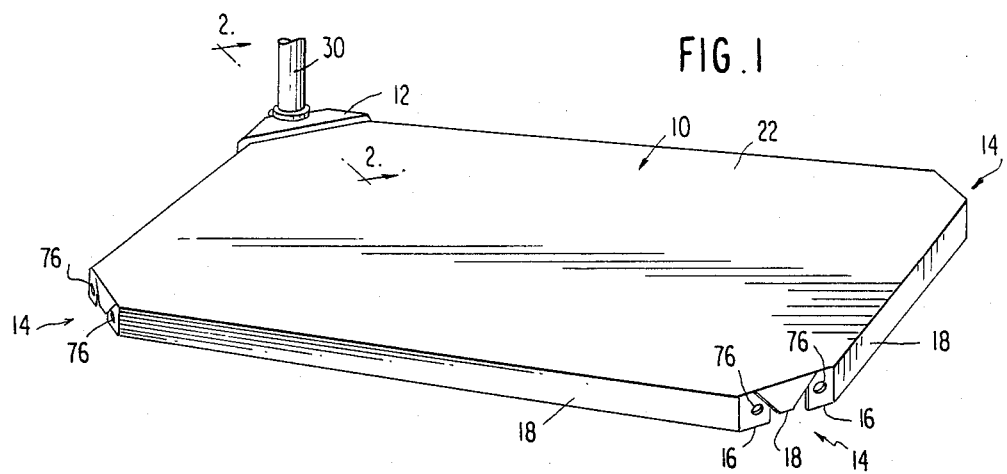
FIG. 1 is a perspective view of a conventional shelving system having one corner connector, made in accordance with the present invention, secured thereto.

The details of this post, sleeve, and frustoconical corner structure bore arrangement are described in U.S. Pat. Nos. 3,424,111 and 3,927,769, the disclosures of which are also incorporated herein by reference, as well as in U.S. Pat. No. 3,874,511.

Referring now to FIGS. 3 through 8, the corner connector 12 in accordance with the present invention is an improvement over those known in the art. This corner connector 12 comprises an insert 40 and an insert housing 42. The insert 40 is preferably made of a rigid and non-corroding material, such as stainless steel to minimize corrosion. The insert housing 42 is made of a non corroding material which provides sufficient strength to support the insert 22, while being asthetically pleasing and sanitary. An example of a suitable material is a nylon resin filled with chopped glass fibers, such as Wilson Fiberfil G-4/45/BK or an equivalent.

As shown in greater detail in FIG. 4, the insert 40 of the corner structure 24 is formed as a generally U shaped brace 44. First and second planar side walls 46 and 48, respectively, extend from an arculate back wall 50 in side by side relation. An ear 52 extends perpendicularly from the extreme of each side wall 46 and 48 and each ear 52 has a hole 54 therein.

Further, each side wall 46 and 48 is formed with reentrant means such as by being punched with a series of axially arranged holes 56 and outwardly projecting vertically arranged tabs 58, the functions of which will be described below.

The housing 42 of each corner structure 24 encapsulates a major portion of the brace 44, namely the side walls 46, 48, the tabs 58 and nearly all of the ears 52, and has flat, parallel top and bottom walls 42 and 43 and vertical side walls 64 that are perpendicular to each other and extend between the top and the bottom walls. A recess 66 extends between an upper lip 68 and a lower lip 70 best shown in FIGS. 3 and 6. Two holes 72 are provided in the housing 42 and each is in alignment with one hole 54 in an ear 52 of the insert when the corner structure is assembled.

Figure 9:
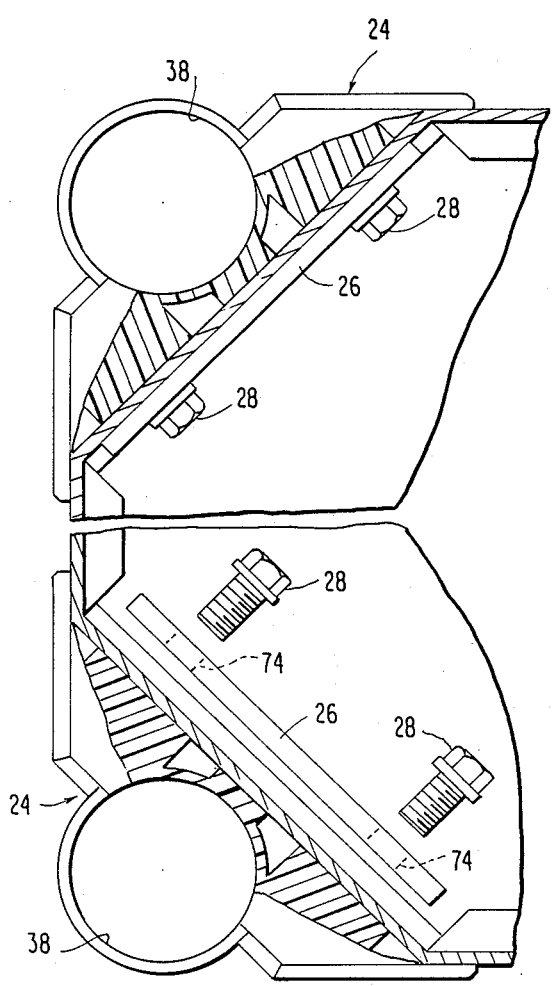
FIG. 9 is a fragmentary view of two corner connectors in accordance with the invention showing how they are secured to a shelf. DETAILED DESCRIPTION OF THE PREFERRED EMBODIMENT
Figure 2:
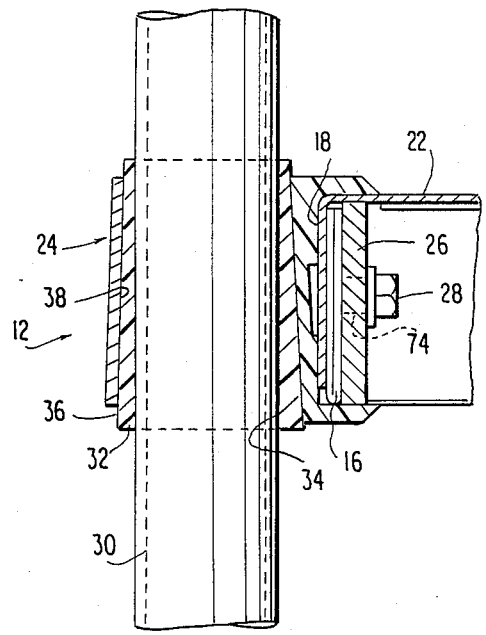
FIG. 2 is a vertical cross sectional view of the shelf and corner connector shown in FIG. 1, taken on plane 2—2.

Referring specifically to FIGS. 1, 2 and 9, a corner structure 12 in accordance with the invention is shown assembled with a shelf 10 in a modular system. As described above, the shelf 10 has truncated corners 14. The clamping bar 26 and screws 28 together comprise the means for fastening each corner connector to one truncated corner.

The screws 28 are inserted through the coaxially aligned holes 74 in the clamping bar 26, threaded holes 76 in the flanges 16, and blind bores 78 axially aligned therewith in the housing 42. In this way, the screws thread into the holes 54 of the insert 40 and the blind bores 78 of the housing 42 to pull the corner toward a truncated corner 14 of the shelf 10. As shown in FIG. 7, the tabs 58 are spaced by a distance substantially equal to the diameter of thread holes 76. The tabs then stabilize and guide the screws 28 within the blind holes 78. A portion of the truncated corner is received in the recess 66 as shown in FIG. 9. Thus, the corner connector 12 and shelf 10 are securely fastened together.

The corner connector 12 of the present invention is preferably manufactured in the following manner. The insert 40 is produced in advance and is then placed into an injection mold. Glass filled nylon resin as described above is injected into the mold and integrally encapsulates a major portion of the insert 40 to constitute a corner structure in accordance with the invention. In such injection molding process, the resin will flow under high pressure into the holes 56 and around the tabs 58 of the insert 40 to ensure secure and permanent engagement between the housing and insert. As can be seen in FIGS. 3 and 7, the housing 42 may be molded with relief cavities 80 to reduce its weight and reduce its material requirement.

A corner structure formed in this manner is simple in construction and inexpensive to manufacture. This corner structure effectively supports a shelf and a load placed thereon on a number of corner posts. In doing so, the corner structure provides advantage equal to that of known cast metal parts since the stainless steel insert, metal clamping bar and screws perform the principal load bearing function. However, the two part assembly comprising the insert and housing has non corroding parts and therefore provides a sturdy and long lasting corner structure. However, since the relatively expensive stainless steel insert and clamping bar constitute a relatively small part of the overall structure, the remainder being constituted by the glass filled nylon resin housing which is less expensive, the overall structure is economical to make.

Moreover, as is apparent in the Figs., the housing has a smooth outer surface that is in keeping with the sanitary requirements of shelving, particularly in the food service industry.

It is to be understood that the present invention has been described with reference to a preferred embodiment. However, this invention may be adapted in other specific forms to other applications without departing from the inventive concepts set forth in the following claims.

What is claimed is:

1. A corner structure comprising:
    A. a corner connector having:
        (1) insert means made of a rigid material and formed to be fastened to a shelf member, said insert means comprising a generally U-shaped brace having an arcuate portion connected to first and second side wall portions, reentrant means in the form of a plurality of tabs disposed on said side wall portions and a plurality of holes formed in said side wall portions, and ear means formed with said side wall portions; and
        (2) housing means made of a non-corroding resinous material and encapsulating a major portion of said insert means, said housing means being formed about said insert means to be integrated therewith with said resinous material received within and filling said plurality of holes and received about said plurality of tabs forming said reentrant means, said housing means and said insert means together defining means for receiving a support member; and
    B. means cooperating with said ear means of said brace for securing said corner connector to a shelf member.

2. A corner structure as recited in claim 1, wherein said ear means comprises an ear portion extending sidewardly and outwardly from each of said side wall portions and in opposite directions from each other, said ear portions each having a hole therein for receiving fastening means for clamping said corner connector to a shelf.

3. A corner structure as recited in claim 2, wherein said plurality of tabs are formed in each of said first and second side wall portions and are in parallel relation with said ear portions.

4. A corner structure as recited in claim 1, wherein said housing means is formed with a recess portion for receiving a truncated corner of the shelf member, said housing means having a smooth outer surface.

5. A corner structure as recited in claim 4, wherein said housing means has bores therein for receiving fastening means to secure said corner connector to the shelf member.

6. A corner structure as recited in claim 1, wherein said insert means is made of stainless steel.

7. A corner structure as recited in claim 1, wherein said housing member is made of glass filled nylon resin.

8. A corner structure comprising:
A. an integrally formed two-part corner connector assembly defining means therein for mounting said corner connector assembly on a vertical support member and fastening said corner connector assembly to a shelf member, said corner connector assembly including:
  (1) as a first part an insert member formed of a non-corroding rigid material and comprising a generally U-shaped brace having an arcuate portion connected to first and second side wall portions that are in side-by-side relation with each other, and reentrant means in the form of a plurality of tabs extending from said side wall portions and a plurality of holes in said side wall portions; and
  (2) as a second part a housing member formed of a non-corroding material that encapsulates and is integrated with a major portion of said insert member, said reentrant means integrating said insert means with said housing means; and
B. securing means adapted to receive fastening means for securing a shelf to said corner assembly.

9. A corner structure as recited in claim 8, wherein said securing means comprise an ear portion extending orthogonally from each of said first and second side wall portions and in an opposite direction from one another, said ear portions each having a hole therein adapted to receive fastening means for clamping said corner connector to the shelf member.

10. A corner structure as recited in claim 9, wherein said plurality of tabs are formed on each of said first and second side wall portions and are in parallel relation with said ear portions.

11. A corner structure as recited in claim 10, wherein said housing means is formed with a recessed portion for receiving a truncated corner of the shelf member, said housing means having a smooth outer surface.

12. A corner structure as recited in claim 11, wherein said housing means has bores therein, each coaxial with one said hole in the ear portions of the insert means and adapted to receive fastening means to secure said corner connector to the shelf member.

13. A corner structure as recited in claim 8, wherein said insert means is made of stainless steel.

14. A corner structure as recited in claim 8, wherein said housing means is made of glass filled nylon resin.

15. A corner structure as recited in claim 8, wherein said fastening means comprises a clamping bar and screw means for securing said clamping bar to said corner connector by being tapped into said insert means, with a portion of said shelf member sandwiched between said clamping bar and said corner connector.

* * * * *

UNITED STATES PATENT AND TRADEMARK OFFICE
CERTIFICATE OF CORRECTION

PATENT NO. : 4,892,044
DATED : January 9, 1990
INVENTOR(S) : JOHN H. WELSCH

Page 1 of 2

It is certified that error appears in the above-identified patent and that said Letters Patent is hereby corrected as shown below:

COLUMN 1

Line 62, "two part assembly." should read --two-part assembly.--.
Line 68, "asthetic" should read --aesthetic--.

COLUMN 2

Line 18, "cross sectional" should read --cross-sectional--.
Line 35, "shelf. DETAILED" should read --shelf. ¶ DETAILED--.

COLUMN 3

Line 10, "non corroding" should read --non-corroding--.
Line 11, "astheti-" should read --aestheti--.
Line 16, "U" should read --U---.
Line 18, "arculate" should read --arcuate--.
Line 19, "side by side relation." should read --side-by-side relation.--.

COLUMN 4

Line 11, "two part" should read --two-part--.
Line 12, "non" should read --non---.
Line 14, "long lasting" should read --long-lasting--.

UNITED STATES PATENT AND TRADEMARK OFFICE
CERTIFICATE OF CORRECTION

PATENT NO. : 4,892,044

DATED : January 9, 1990

INVENTOR(S) : JOHN H. WELSCH

Page 2 of 2

It is certified that error appears in the above-identified patent and that said Letters Patent is hereby corrected as shown below:

COLUMN 6

Line 4, "comprise" should read --comprises--.

Signed and Sealed this

Twenty-fifth Day of June, 1991

Attest:

*Attesting Officer*

HARRY F. MANBECK, JR.

*Commissioner of Patents and Trademarks*